2,902,376

POLYETHYLENE WAX AEROSOL COMPOSITIONS AND PROCESS FOR PREPARING THEM

John H. Beacher, Oradell, N.J., and Harvey A. Troutman, Searsport, Maine, assignors to Allied Chemical Corporation, a corporation of New York No Drawing. Application March 25, 1957
Serial No. 647,987

7 Claims. (Cl. 106—10)

This invention relates to polyethylene wax compositions, and more particularly to compatible compositions of pressure generating liquids with dispersions of solid polyethylene waxes in volatile liquids.

Self propellant compositions are well known, and since the original development of such self propellant mixtures as fire extinguishers, carriers for insecticides and the like, for the application of so-called "aerosol" sprays, the same or similar aerosol techniques have been adapted for use in many different fields to apply coatings of a wide variety of materials. In general, such compositions employ one or more haloalkanes having a high vapor pressure at room temperatures, both as the propellant and as the solvent for the solid or liquid material to be sprayed. Where the material to be propelled is not soluble in the propellant, it has been dissolved in a solvent liquid and formed into an emulsion with the liquid propellant. This method is said to be successful for making liquid waxes and wax solutions sprayable.

Recently a number of efforts have been made to form self propellant compositions containing the normally solid, hard waxes such as carnauba wax to take advantage of the wide use of such waxes in the floor and car polish fields as well as in other applications. Such hard waxes are largely insoluble in the commonly used propellants as well as in the commonly used resin and lacquer solvents. When these solid waxes are formed into dispersions, and mixed with liquid propellants, the resulting mixtures tend to form agglomerates and/or to separate from the suspension as a hard cake at the surface of the liquid. The agglomerated and separated wax particles result either in clogging of the aerosol spray valves or sometimes in failure of the aerosol to deliver an adequate amount of the wax coating. Efforts to overcome this separation and caking by placing marbles or other relatively large solid material in the can to aid redispersion on shaking have not proved completely successful. Such compositions, therefore, have proved unsatisfactory for aerosol application.

It is an object of the present invention to provide self propellant waxy compositions which will not agglomerate or separate from the suspension in cake form and will not result in troublesome clogging of standard spray type aerosol valves.

Another object of the invention is to provide a wax composition suitable for aerosol spray application as a wax polish from a standard hand-operated spray can, from which the contents can be completely removed without troublesome clogging of the valve.

These and other objects are accomplished according to our invention wherein a polyethylene wax, particularly an oxidized polyethylene wax, having an average molecular weight between about 1,000 and about 3,000, is dispersed in a hydrocarbon or chlorinated hydrocarbon liquid in which it is soluble at elevated temperatures and insoluble at normal room temperature, and the resulting dispersion blended with between about 40% and about 80%, based on the total weight of the composition, of a volatile liquid propellant material having a boiling point at atmospheric pressure below atmospheric temperature, preferably below about 25° C.

The success of our compositions is based on the discovery that the polyethylene waxes as defined, are unique in forming dispersions which will remain in creamy flocculent suspension in the normally employed propellant mixtures such as the haloalkanes, especially the fluorochloromethanes and fluorochloroethanes such as the "Freons" and "Genetrons." Thus, unlike other hard waxes, such as carnauba wax, suitable for polish compositions, the polyethylene waxes, as defined, when dispersed in a liquid in which they are soluble at elevated temperatures and insoluble at room temperatures, and the resulting dispersion is suspended in the propellant mixture, form homogeneous, "compatible," creamy, flocculent suspensions which have little or no tendency to agglomerate, and which on standing for extended periods rise to the top of the liquid carrier mixture, remaining in this creamy flocculent form indefinitely in storage instead of separating and agglomerating or caking as do the hard waxes heretofore used.

The success of our compositions appears to depend on the presence of a flocculent creamy suspension in a liquid readily dispersible, i.e. "compatible," with the liquid carrier on gentle shaking, and which, on standing tends to rise as a cream to the top of the liquid phase without agglomeration or caking.

As is well recognized, the polyethylene waxes are virtually insoluble in most of the common volatile solvent liquids at normal atmospheric temperatures, but are soluble to some extent in certain volatile liquids at elevated temperatures particularly above the melting points of the waxes, and can be formed into dispersions by dissolving the waxes in such solvents at elevated temperatures followed by cooling.

In preparing the compositions of our invention the polyethylene wax as defined is dissolved in the hot solvent at a temperature below the boiling point of the solvent, preferably in the range of 70–130° C. After complete solution has been effected, the mixture is cooled to room temperature (ca. 25° C.), or below, preferably with moderate stirring, whereupon the polyethylene wax separates out as an extremely fine, stable dispersion in the "solvent." If desired, flammability retarding liquids may then be added, for example methylene chloride ($CH_2Cl_2$). The wax suspension mixture is then mixed with the liquid propellant, usually a liquefied gas, by any suitable conventional procedure, for example by the usual "pressure filling" method, in suitable spray containers of conventional type fitted with a standard spray type aerosol valve connected to a stand-pipe extending to near the bottom of the container and terminating at the top in a finger-operated valve connected to a spray nozzle or orifice.

The resuling compositions, when prepared with oxidized polyethylene wax of the character specified can be sprayed from such an aerosol can so that the can may be completely emptied of the wax composition with no clogging whatsoever by a constant single depression of the valve. This characteristic persists even after long periods of storage, i.e. several months or more. In the case of the unoxidized polyethylene waxes these compositions also may be sprayed to complete removal from the aerosol cans with no clogging of the internal valve mechanism when freshly prepared, and, after storage, if preceded by gentle shaking or merely upending the can before use.

Suitable polyethylene waxes for use in our compositions include the normally solid, waxy polyethylenes having average molecular weights in the range between about 1,000 and about 3,000. For many purposes, particularly for use in car polishes, etc., we prefer to use the hard polyethylene waxes, i.e. having hardness characteristics corresponding to penetrations below about 0.7 mm. as measured by the standard ASTM penetration test D-5-25. For other purposes, notably in the preparation of aerosol compositions to be used as mold release agents the somewhat softer, lower melting polyethylene waxes are equally satisfactory and have the advantage of greater ease of dispersion in the solvent at lower temperatures. The polyethylene waxes may be either in strictly hydrocarbon form, or in the form of a telomer i.e. a polyethylene wax having a terminal residue on the polyethylene chain resulting from polymerization in the presence of a coreactant, for example as disclosed in U.S. Patents 2,683,141 and 2,504,400 of Michael Erchak, Jr. However, in the form of the oxidation products of one of the above polyethylene waxes such waxes produce especially valuable compositions. Such oxidized waxes may be prepared for example by contacting the polyethylene wax in the liquid phase with an oxygen-containing gas in the absence or presence of an unsaturated acid or anhydride such as maleic anhydride or fumaric acid, and may contain from about 2% to about 6% oxygen as disclosed in co-pending applications Ser. No. 515,770 of Michael Erchak, Jr., filed June 15, 1955, and Ser. No. 524,620 of John N. Cosby and Wilbur F. Chapman, filed July 26, 1955. The polyethylene/isopropanol telomer waxes are preferred, particularly the oxidized polyethylene isopropanol telomer waxes containing between about 2% and about 4% oxygen. Such oxidized waxes, when incorporated in the aerosol compositions of our invention, have been found to produce aerosols which are greatly superior in spraying characteristics to the unoxidized polyethylene waxes and to offer virtually complete freedom from valve clogging tendencies in the aerosol compositions of our invention.

Suitable solvents for the polyethylene waxes include the volatile hydrocarbons and chlorinated hydrocarbons boiling from about 75° C. to about 180° C. such as benzene, toluene, xylene, mineral spirits, petroleum naphthas such as VM & P naphtha (boiling range 93°–149° C.), trichloroethylene, carbon tetrachloride, dichloroethylene, dichlorobenzene and the like which are miscible with the propellant mixture used. Mixtures of two or more of the above solvents may be used. The quantity of solvent used will be sufficient to form a solution at elevated temperatures of the desired amount of wax required to form a dispersion of the wax on cooling which will produce a homogeneous dispersion with the propellant. Normally an amount of solvent will be used, which will produce dispersions in the range of between about 2% and about 20% wax by weight, and preferably, the smallest quantity which will adequately disperse the required amount of wax will be used.

Suitable propellants include those conventionally used in aerosol mixtures i.e. volatile haloalkanes or mixtures thereof whose boiling points at atmospheric pressure are below atmospheric temperature, preferably below about 25° C. i.e. the haloalkanes and especially the fluorochloro alkanes having 1 to 2 carbon atoms. Especially preferred are the compounds or mixtures which permit preparation of the so-called "low pressure" aerosols, i.e. formulas with a gauge pressure not exceeding 40 pounds per square inch at 70° F. which may be used in light containers according to Interstate Commerce Commission permit granted July 28, 1947. Such propellant mixtures may include mixtures of propellants alone or mixtures of one or more propellants with compatible diluents to provide the desired pressure.

Typical propellants and propellant constitutents are listed below:

| Propellants: | Boiling point, ° C. |
|---|---|
| $CCl_2F_2$ | −29 |
| $CClF_3$ | −82 |
| $CHCl_2F$ | +8 |
| $CHClF_2$ | −41 |
| $CClF_2CClF_2$ | +4 |
| $CH_3CHF_2$ | −26 |
| $CH_3CClF_2$ | −10 |
| $CCl_3F$ | +24 |

The preferred propellant for use in the compositions of our invention is $CCl_2F_2$ ("Genetron 12") B.P.—29° C. Used alone, this compound produces formulations having gauge pressures at 70° F. of up to 85 p.s.i., suitable for use in high pressure dispensers. To reduce the pressure exerted by formulations containing this propellant, it may conveniently be diluted with $CCl_3F$ (B.P. 24° C.) "Genetron 11" to produce a gauge pressure of not more than 40 p.s.i. at 70° F. Accordingly mixtures of $CCl_2F_2$ and $CCl_3F$ are the preferred propellant mixtures. Mixtures of equal parts of these two compounds produce a satisfactory low pressure propellant.

To reduce the flammability of the formulations, chlorinated hydrocarbons such as methylene chloride ($CH_2Cl_2$, B.P. 39° C.) may be used. These compounds may be considered in the same category as the propellants and function also as diluents for the propellant mixture.

The quantity of propellant used will vary, and will be determined by the pressure desired, which should be adequate to propel the composition through the orifice in a fine spray. In general, the liquid portion of our compositions, including polyethylene solvent-dispersant and propellant will constitute the preponderant proportion of the compositions and may be as high as 99.5% or higher, or may be as low as about 80%. Proportion of a propellant to solvent-dispersant will also depend to a large extent on pressure desired, and the character of the polyethylene wax solvent used. Usually the propellant, or the propellant mixture, including diluents and fire retardants such as methylene chloride, will comprise at least about 40% of the final composition, usually between about 40% and about 80%.

In general the polyethylene waxes, i.e. either the unoxidized or oxidized polyethylene waxes or mixtures of these waxes will be used as the sole wax constituent of our formulas. Thus attempts to use blends of the polyethylene waxes with carnauba wax result in agglomeration of the wax suspension with resultant severe valve clogging on attempts to spray the compositions, even when quantities of carnauba wax as low as 17% of the total wax content are used admixed with the preferred oxidized polyethylene wax. Blends of the polyethylene waxes with microcrystalline waxes similarly are not satisfactory, producing suspensions which tend to separate and to form hard cakes on storage.

The quantity of polyethylene wax or oxidized polyethylene wax used in our formulations will depend partly on the purpose of the formulation, even extremely low concentrations being suitable for certain purposes such as waterproofing or rendering materials water repellent as in fishermen's fly sprays and the like. In general quantities between about 0.5% and about 10% in the final formulation are satisfactory.

As brought out above, the polyethylene waxes and oxidized polyethylene waxes used in our aerosol compositions are insoluble in the cold solvent mixture and are similarly insoluble in the propellant. However, the polyethylene solvent and the propellant mixture are sufficiently miscible so that an apparently homogeneous dispersion is formed when the wax dispersion is blended with the propellant. At the moment of spraying, the dispersion should have this homogeneous character. With the wax dispersions of our invention, this homogeneity is easily obtained by the initial blending, and if some separation occurs on quiescent storage, redispersion is easily effected by gentle shaking; thus, although the liquid phase of the dispersion may tend to separate from the solid upon prolonged quiescent storage, such separation does not result in agglomeration of the wax solids as in the case of carnauba and microcrystalline waxes, but produces a creamy froth, floating on top of the separated liquid, which is readily redispersible in the entire body of the liquid.

If desired, various ancillary materials may be added to our compositions including dyes, polishing agents (abrasive powders) and the like. In the case of wax polish compositions, the addition of small proportions of silicone fluids (e.g. dimethylsiloxane) are advantageous in providing high gloss or "polishability" without undue rubbing, and avoid the necessity of adding abrasive powders which tend to cause valve clogging. Proportion of silicone will depend on the proportion of wax in the composition, larger quantities of wax requiring larger proportions of the silicone fluid, usually about 50% silicone based on the wax, or between about 0.5% and about 5% silicone by weight in the total composition are sufficient. Our aerosol compositions are especially useful in "self polishing" car wax formulations to provide a glossy, protective finish to the cleaned car body in a matter of a few minutes by spraying, allowing to dry, and wiping off excess; thus eliminating the laborious and time consuming hand application and hand polishing of paste wax car polishes. They are also useful in the preparation of paint remover compositions, fisherman's fly sprays and are highly effective as aerosol mold release agents. Formulations will, of course, vary somewhat depending on the end use of the compositions. Suitable formulas for several purposes are set forth below:

FORMULA #1.—CAR POLISH

| | Percent by weight |
|---|---|
| Oxidized polyethylene wax [1] | 3.0 |
| Silicone liquid | 1.8 |
| VM & P naphtha | 50.2 |
| CCl$_2$F$_2$ ("Genetron 12") | 45.0 |
| | 100.0 |

FORMULA #2.—PAINT REMOVER

| | Percent by weight |
|---|---|
| Oxidized polyethylene wax [1] | 2 |
| Methylene chloride | 28 |
| Methanol | 10 |
| Acetone | 20 |
| Trichloroethylene | 15 |
| CCl$_2$F$_2$ ("Genetron 12") | 24 |
| | 100.0 |

FORMULA #3.—FISHERMAN'S FLY SPRAY

| | Percent by weight |
|---|---|
| Oxidized polyethylene wax [1] | 1 |
| Methylene chloride | 20 |
| VM & P naphtha | 14 |
| CCl$_2$F$_2$ ("Genetron 12") | 32.5 |
| CCl$_3$F ("Genetron 11") | 32.5 |
| | 100.0 |

FORMULA #4—FISHERMAN'S FLY SPRAY

| | Parts by weight |
|---|---|
| Oxidized polyethylene wax [1] | 4.3 |
| Dimethyl siloxane (DC-200) | 2.3 |
| Methylene chloride | 25.0 |
| VM & P naphtha | 23.4 |
| CCl$_2$F$_2$ ("Genetron 12") | 45.0 |
| | 100.0 |

FORMULA #5.—MOLD RELEASE AGENT

| | Parts by weight |
|---|---|
| Polyethylene/isopropanol telomer wax (average mol. wt. 1500, M.P. 88–90° C., penetration 2.0–2.5 mm.) | 3 |
| VM & P naphtha | 20 |
| Methylene chloride | 7 |
| CCl$_2$F$_2$ ("Genetron 12") | 35 |
| CCl$_3$F ("Genetron 11") | 35 |
| | 100.0 |

[1] Containing about 3% oxygen; average molecular weight 1700.

The following specific examples further illustrate our invention. Parts are by weight except as otherwise noted.

Examples 1–7

A series of car polish formulations were prepared by mixing 22 parts of polyethylene wax or oxidized polyethylene wax with twelve parts of silicone liquid (dimethyl siloxane "DC-200") and heating until the wax had melted. To each of these mixtures were added 120 parts of VM & P naphtha (boiling range 93° C.–149° C.), and the mixture heated at 85° C. until clear. One of the above mixtures was made up with a polyethylene/isopropanal telomer wax, having an average molecular weight of about 2,000, melting point of 102°–106° C. and a penetration value between about 0.1 mm. and about 0.2 mm. (ASTM D–5–25). The other mixture was prepared with an oxidized polyethylene/isopropanol telomer wax containing about 2% oxygen, having an average molecular weight of about 1800, a melting point between about 99° C. and about 101° C. and penetration of between about 0.15 mm. and about 0.20 mm. (ASTM D–5–25).

The hot solutions thus prepared were cooled, whereupon the polyethylene wax separated as a thin creamy flocculent dispersion in the naphtha.

Each of these dispersions was divided into three portions which were blended in proportions of 30%, 40% and 55% with propellant liquids of the character set forth in Table I below. This was accomplished by placing each portion in a 12 ounce aerosol spray can equipped with a standard aerosol valve, and adding the indicated proportion and type of propellant, using the standard pressure filling procedure.

Each can was then sprayed against clean ceramic tiles to substantially complete removal from the can by a single sustained depression of the valve button, noting (1) whether any valve clogging occurred, (2) character of the spray, i.e. whether sputtering occurred, (3) character of application, i.e. whether uniform distribution of the coating on the tile was obtained, and the removability or polishability of the film on the tile.

One formulation was prepared containing 30% methylene chloride as shown in Example 7, and was similarly tested. It was found to produce a spray capable of qualifying for shipment without an "inflammable" label according to Interstate Commerce Commission Standards.

Results are shown in Table I below in which a notation of "good" under "character of spray" means that the spray did not sputter, was not too fine (dry) or too wet. A notation of "good" under "application" means that the spray applied a uniform coating to the tile when held a distance of about 7–9 inches from the surface, i.e. was not so fine as to overload the surface in spots or so coarse (wet) as to produce a speckled pattern. A notation of v.g. under "Polishability" means that the excess coating was removable in a single swipe of a polishing cloth, leaving a fine film of wax on the surface. A notation of OK means that at least two swipes were necessary, but not more than three swipes which is considered satisfactory for a "non-rubbing" car polish.

lowed to stand for 14–15 days, and observations were made at approximately 2 to 3 day intervals after each of

TABLE I

|  | Example Number | | | | | | |
| --- | --- | --- | --- | --- | --- | --- | --- |
|  | 1 | 2 | 3 | 4 | 5 | 6 | 7 |
| Polyethylene Wax | 0 | 0 | 4.3 | 4.3 | 5.7 | 7.8 | 0 |
| Oxidized Polyethylene Wax | 4.3 | 5.7 | 7.8 | 0 | 0 | 0 | 3.6 |
| Dimethyl Siloxane | 2.3 | 3.1 | 4.3 | 2.3 | 3.1 | 4.3 | 1.9 |
| VM & P Naphtha (B.P. 93–149° C.) | 23.4 | 31.2 | 42.9 | 23.4 | 31.2 | 42.9 | 19.5 |
| "Genetron 11" ($CCl_3F$) | 35 | 30 | 0 | 35 | 30 | 0 | 0 |
| "Genetron 12" ($CCl_2F_2$) | 35 | 30 | 45 | 35 | 30 | 45 | 45 |
| Methylene Chloride |  |  |  |  |  |  | 30 |
| Valve Clogging | none | none | none | none | none | none | none |
| Character of Spray | good | good | good | good | good | good | good |
| Application | good | good | good | good | good | good | good |
| Polishability | V.G. | V.G. | OK | OK | OK | OK | OK |

*Example 8*

In order to compare the sprayability of aerosol formulations containing waxes other than polyethylene waxes, including carnauba wax and microcrystalline wax, with oxidized polyethylene wax formulations and to determine the effect of mixtures of such other waxes with oxidized polyethylene wax, a series of formulations was prepared in which these waxes were substituted for all, and various proportions of the oxidized polyethylene wax in the following formula:

| | Parts by weight |
| --- | --- |
| Total wax | 3 |
| Silicone | 1.8 |
| VM & P naphtha | 50.2 |
| $CCl_2F_2$ | 45 |
| | 100.0 | thus producing aerosols having the test wax as the total wax content; and as 75%; 50%; 33%; 24% and 17% of the total wax.

The aerosols were prepared by the technique described in Examples 1–7 above. Before placing them into the standard aerosol cans and adding the propellant, the various formulations were examined under the microscope, and tendencies to form crystals or to agglomerate and separate were noted.

A portion of each formula was placed in a transparent glass bottle and corked. Upon cooling to room temperature the formulations were visually examined, and the extent of precipitation or separation and the character of the precipitate, whether of agglomerates or a flocculent suspension, were noted. The mixtures were allowed to stand for another 2–3 days. The character of the mixtures was noted after each interval.

Other portions of each formula were tested for gloss by applying them to black enameled tile by swabbing, and after permitting the formula to dry for a few moments and polishing with cheesecloth, examining the surface with a Gardner 60° glossmeter adjusted to 100% gloss on a clean tile, noting the percent gloss based on the original tile as 100%.

Still other portions of the formulations were placed in standard aerosol cans and propellant added. The aerosols were thoroughly shaken and the valve held open until the can had emptied, noting the number of times the spray stopped. Spraying was considered satisfactory if no stoppages occurred.

Results of the tests are shown in Table II below.

TABLE II.—COMPARISON OF SPRAYABILITIES OF WAX AEROSOLS CONTAINING OXIDIZED POLYETHYLENE WAX COMPARED WITH AEROSOLS CONTAINING CARNAUBA WAX AND MICROCRYSTALLINE WAX, ALONE AND ADMIXED WITH VARYING PROPORTIONS OF OXIDIZED POLYETHYLENE WAX, IN STANDARD FORMULA CONTAINING 3% TOTAL WAX

| Wax: Type and Percent of Total | | | Gloss, Percent | Character of spray | Failed due to— |
| --- | --- | --- | --- | --- | --- |
| Oxidized Polyethylene | Carnauba | Microcrystalline | | | |
| 100 | 0 | 0 | 92 | Satisfactory | No failure, cream like suspension persisted after 15 days. |
| 0 | 100 | 0 | 95 | Unsatisfactory | Agglomeration. |
| 25 | 75 | 0 | 91 | do | Do. |
| 50 | 50 | 0 | 90 | do | Do. |
| 67 | 33 | 0 | 92 | do | Do. |
| 76 | 24 | 0 | 97 | do | Do. |
| 83 | 17 | 0 | 93 | Satisfactory | Agglomeration and Separation. |
| 0 | 0 | 100 | 89 | Unsatisfactory | Separation; formation of long crystals. |
| 50 | 0 | 50 | 91 | do | Agglomeration; Separation long crystals. |
| 67 | 0 | 33 | 93 | do | Separation as cake. |

The agglomeration noted in the case of carnauba wax alone and in mixtures with polyethylene wax appeared as a "mealiness" having the appearance of coarse corn meal. The agglomerates separate from the liquid phase, cause repeated frequent clogging of the aerosol valve, and after quiescent standing for several weeks become cakes which are difficult or impossible to redisperse to give a satisfactory aerosol spray.

The separation noted in the case of the microcrystalline wax appears as a sharp crystalline precipitate which can be redispersed when freshly prepared, but which is difficult or impossible to redisperse after a few weeks' storage and which eventually solidifies to a hard cake.

It will be seen from the data presented in Table IV that carnauba wax alone or in admixture with oxidized polyethylene wax, even in proportion down to 17% of the total wax content (2.5% oxidized polyethylene and 0.5% carnauba in the test formula), acts to cause agglomeration of the wax in the formulation with resultant valve clogging on spraying. Some slight lessening of agglomeration was noted at the lower concentrations of carnauba wax, but not sufficient to produce a satisfactory spray.

The formulations containing microcrystalline wax formed precipitates which separated and formed hard cakes which were difficult or impossible to redisperse completely on shaking after standing for several weeks.

*Example 9*

Wax "aerosol" compositions were prepared, using as the wax material in separate compositions, (a) oxidized polyethylene wax having an average molecular weight of about 1700, oxygen content of about 3%, melting point 98° to 100° C. and penetration of between about 0.25 mm. and about 0.35 mm. by ASTM method D–5–25; (b) unoxidized polyethylene wax having an average molecular weight about 2,000, melting point 97°–102° C. and penetration between about 0.2 mm. and about 0.3 mm.; (c) unoxidized polyethylene wax having an average molecular weight of about 1500, melting point of about 88°–90° C. and hardness between about 2.0 mm. and about 2.5 mm., and (d) carnauba wax (North Country No. 1 yellow), in the formula given below:

| | Percent by weight |
|---|---|
| Wax | 3 |
| VM & P naphtha | 20 |
| Methylene chloride | 7 |
| $CCl_2F_2$ ("Genetron 12") | 35 |
| $CCl_3F$ ("Genetron 11") | 35 |
| | 100.0 |

The compositions were prepared by melting the wax, adding the major portions of the VM & P naphtha, preheated to 85° C., to the wax and heating at 85° C. until the solution was clear. The solutions were then cooled to room temperature (ca. 25° C.) causing precipitation of the wax as a dispersion in the solvent. The remaining naphtha and methylene chloride were then added.

These dispersions were placed in separate 6 ounce aerosol cans with standard valves, and propellant mixture (equal parts $CCl_2F_2$ and $CCl_3F$), cooled to its boiling point, added, and the cans capped.

Each can of aerosol composition thus prepared was allowed to stand quiescent for 10 days, and each was then subjected to a 5 second shaking and immediately thereafter (within 5 seconds) subjected to a 10 second spray burst and noting whether the valve clogged so as to stop the spray. After spraying, the cans were replaced on the shelf, allowed to remain quiescent for another day and were retested after a similar 5 second shaking with another 10 second spray burst. This procedure was repeated each day for 10 days.

No valve clogging occurred in any of the polyethylene wax formulations (a, b or c). On each ten second burst the carnauba wax aerosol clogged an average of 3.2 times and was only made operative again by manipulating the valve or cleaning the spray head.

The aerosol compositions of the above example are especially effective as mold release sprays for depositing a polyethylene wax parting agent on the working surfaces of molds or dies to facilitate the release of cast or molded objects from the die or mold. The mold release- or parting-agent, in the form of the above composition, is applied to the mold as a fine mist or spray which deposits a uniform film of the polyethylene wax release agent on the surface of the mold. These agents provide excellent release for alkyd, phenolic, phenolic-rubber modified, urea and melamine molding compounds. They are unusually effective as parting agents for the preparation of plastic tools and prototypes, the casting of which has heretofore presented great difficulty due to excessive sticking of the molded object to the mold. With the above compositions it is now possible to effect the casting of epoxy resin tools in epoxy resin molds, an accomplishment previously impracticable because of release difficulties. The new mold release sprays are also effective release agents in powder metallurgy and in other molding fields.

The above compositions, when subjected to the standard flammability and combustibility tests including the "flame projection test," the "open drum test" and the "closed drum test" give results of "not flammable" in each test so that the compositions may be classified according to Interstate Commerce Commission requirements as not requiring a red label.

Proportions of ingredients used in the above mold release agents may be varied considerably, proportions from about 1% to about 10% wax, preferably about 2% to about 5%, being suitable, while proportions of methylene chloride above about 2% will produce nonflammable compositions, so that proportions between about 2% and about 10% will usually be employed. A propellant mixture comprising between about 60% and about 80% of the composition will usually be satisfactory.

While the above describes the preferred embodiments of our invention, it will be understood that departures may be made therefrom within the scope of the specification and claims.

We claim:

1. A self propellant composition adapted to be sprayed from standard aerosol containers substantially without valve clogging, consisting essentially of a mixture of (1) between about 20% and about 60% of a finely divided creamy flocculent dispersion of from 2% to 5% based on the final composition of a solid polyethylene wax material selected from the group consisting of polyethylene waxes and oxidized polyethylene waxes having average molecular weights between about 1,000 and about 3,000, in a volatile solvent boiling between about 75° C. and about 180° C. selected from the group consisting of hydrocarbons and chlorinated hydrocarbons and (2) between about 40% and about 80% of a pressure generating liquid miscible with said volatile solvent, boiling below 25° C., selected from the group consisting of haloalkanes having from 1 to 2 carbon atoms.

2. The composition according to claim 1 wherein between about 2% and about 10% of the pressure generating liquid is methylene chloride.

3. A self propellant spray wax car polish composition adapted to be sprayed from standard aerosol containers substantially without valve clogging, consisting essentially of a homogeneous mixture of (1) a finely divided, creamy, flocculent dispersion of from about 1% to about 10% of an oxidized polyethylene wax having an average molecular weight between about 1,000 and about 3,000 and penetration between about 0.25 and about 0.35 mm. as measured by ASTM–D–5–25, in a volatile solvent boiling between about 75° C. and about 180° C. selected from the group consisting of hydrocarbons and chlorinated hydrocarbons, and (2) between about 40% and about 80%, based on the total weight of the composition, of a pressure generating liquid miscible with said volatile solvent, boiling below 25° C., selected from the group consisting of haloalkanes having from 1 to 2 carbon atoms.

4. The composition of claim 1 wherein the volatile solvent is a petroleum naphtha having a boiling range from about 93° C. to about 149° C. and wherein the pressure generating liquid is a mixture of about equal parts of dichlorodifluoromethane and trichlorofluoromethane and wherein the flocculent creamy dispersion on long standing floats at the top of the composition.

5. A self propellant mold release composition adapted to be sprayed from standard aerosol containers substantially without valve clogging, consisting essentially of a homogeneous mixture of (1) a finely divided creamy, flocculent dispersion of from about 2% to about 5% of a solid polyethylene wax material selected from the group consisting of polyethylene/isopropanol telomer waxes and oxidized polyethylene/isopropanol telomer waxes having average molecular weights between about 1,000 and about 3,000 melting points between about 88° C. and about 102° C., and penetrations between about 0.2 mm. and about 2.5 mm. as measured by ASTM–D–5–25, in a petroleum naphtha having a boiling range between about 93° C. and about 149° C., (2) between about 60% and about 80% of a pressure generating liquid miscible with said petroleum naphtha, consisting of a mixture of about equal parts of dichlorodifluoromethane and trichlorofluoromethane, and (3) between about 2% and about 10% of methylene chloride, all percentages being in terms of percent by weight of the total weight of the compositions.

6. The composition according to claim 3, wherein the polyethylene wax is an oxidized polyethylene/isopropanol telomer wax having an average molecular weight of about 1700, oxygen content of about 3%, melting point between about 98° C. and about 100° C. and penetration of between about 0.25 mm. and about 0.35 mm. as measured by ASTM method D–5–25.

7. The composition according to claim 1 which contains in addition a small quantity, between about 0.5% and about 5% by weight in the total composition, of a silicone fluid.

References Cited in the file of this patent
UNITED STATES PATENTS

| | | |
|---|---|---|
| 2,409,683 | Howk et al. | Oct. 22, 1946 |
| 2,524,590 | Boe | Oct. 3, 1950 |
| 2,614,049 | Swanson | Oct. 14, 1952 |

UNITED STATES PATENT OFFICE

CERTIFICATE OF CORRECTION

Patent No. 2,902,376

September 1, 1959

John H. Beacher et al

It is hereby certified that error appears in the printed specification of the above numbered patent requiring correction and that the said Letters Patent should read as corrected below.

Column 12, line 3, strike out "The composition according to claim 3" and insert instead -- The composition according to claim 5 --.

Signed and sealed this 22nd day of March 1960.

(SEAL)
Attest:

KARL H. AXLINE
Attesting Officer

ROBERT C. WATSON
Commissioner of Patent